UNITED STATES PATENT OFFICE.

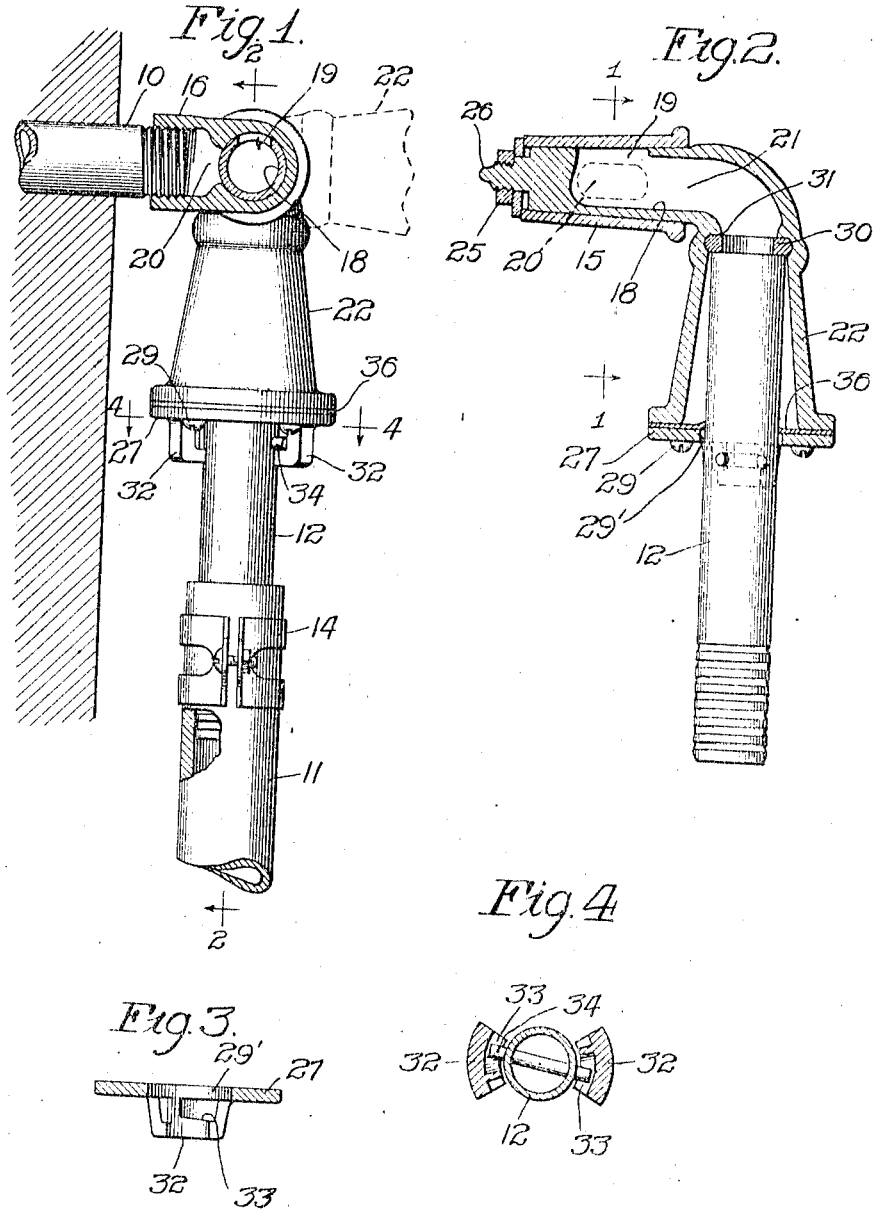

HENRY J. NEUMEISTER, OF CHICAGO, ILLINOIS.

COMBINED QUICK-DETACHABLE COUPLING AND VALVE.

1,115,007.

Specification of Letters Patent. Patented Oct. 27, 1914.

Application filed April 17, 1913. Serial No. 761,715.

*To all whom it may concern:*

Be it known that I, HENRY J. NEUMEISTER, a citizen of the United States, and a resident of Chicago, in the county of Cook and State of Illinois, have invented certain new and useful Improvements in Combined Quick-Detachable Couplings and Valves; and I do hereby declare that the following is a full, clear, and exact description thereof, reference being had to the accompanying drawings, and to the characters of reference marked thereon, which form a part of this specification.

This invention relates to improvements in combined quick detachable hose couplings and valves, and refers more specifically to that type of valve and coupling in which the coupling member of the valve is formed or made a part of the valve plug and the movement of which opens and closes the valve.

The invention consists in the matters hereinafter set forth and more particularly pointed out in the appended claims.

Figure 1 is an elevation and partial section, with parts broken away, of a valve and coupling embodying my invention, the section being taken on line 1—1 of Fig. 2. Fig. 2 is a section on the line 2—2 of Fig. 1. Fig. 3 is a section of the cap plate for the coupling member of the valve plug. Fig. 4 is a section on the line 4—4 of Fig. 1.

In the drawings, 10 designates the water or other pipe to which the valve is connected, 11 the hose which is connected to said pipe through the combined valve and hose coupling and 12 a hose nipple to which the hose is clamped, as by the clamp 14 and which is adapted to enter the movable member or extension of the valve plug.

The valve comprises as its principal elements a casing 15 having an internally screw-threaded branch 16 by which it is connected to the screw-threaded end of the pipe 10, and a hollow plug 18 fitted within the casing and provided with a port 19 adapted to be moved by rotation of the plug into and out of register with a coacting port 20 formed between the valve casing and its branch. The plug is made hollow so as to provide therein a passage 21 for the flow of fluid. It is provided with a hollow flaring extension member 22, the axis of which is herein shown as arranged at 90° from the axis of the plug. The casing is herein shown as made interiorly tapered and the plug is correspondingly tapered to fit the casing, and the parts are held with their tapered surfaces fitted together by means of a nut 25 screw-threaded to a stud or extension 26 of the plug, which stud extends through the wall of the smaller end of the casing.

The coupling or extension member 22 is provided with an end wall or member 27, herein shown as made separate therefrom and attached thereto by the screws 29. This end wall of the coupling member has an opening 29' to receive the coupling nipple 12. The coupling member is provided near its inner end with a recess to receive a gasket 30 against which the inner end of the coupling nipple bears, the gasket being compressed between the inner end of the nipple and the shoulder 31 at the inner side of said recess.

The coupling nipple 12 is pressed against the packing gasket 30 to produce a fluid tight joint between the gasket and nipple. As herein shown this connection is effected by endwise thrust of the nipple against the gasket. Such endwise thrust of the nipple may be effected by providing the end wall 27 of the coupling extension of the valve plug with lugs 32, 32, which are formed with cam surfaces 33, 33 that are engaged by lugs 34, herein shown as formed by the ends of a pin which extend diametrically through the nipple in the manner most clearly shown in Figs. 1 and 4. The said lugs 32 are spaced so that when inserting the nipple into the valve plug extension the lugs 34 pass between the lugs 32; and upon turning the nipple on its axis the lugs engage the cam surfaces in a manner to effect endwise thrust of the nipple against the gasket 30.

A second or auxiliary fluid tight joint is provided between the hose nipple and the outer end of the plug extension so as to prevent the escape of fluid past the nipple in case the inner joint formed between the nipple and the gasket 30 should become impaired. The outer or auxiliary joint is formed by means of a gasket or washer 36 which is herein shown as clamped between the end of the plug extension and its end wall, as best shown in Fig. 2. This washer is made of somewhat less internal diameter than the opening 29ᵃ in said end wall 27 so as to closely surround the hose nipple. When the nipple is inserted into the plug extension therefore, the said washer or gasket adjacent to its opening is forced inwardly, so that any fluid pressure within the plug extension against the inner side of the gasket acts to force the gasket against the nipple and produce a good fluid tight joint between the plug extension and nipple.

The combined valve and quick detachable hose coupling has been designed for use under conditions where water is intended to be drawn from a pipe and used through a hose over a relative wide space, as for instance, in a garage where water is to be drawn from a pipe for use in washing automobiles or vehicles which may be located on different parts of the floor of the garage. Other uses for the valve and connection are found in its use with a lawn hose, a fire plug hose and the like.

The advantage of the device is that the coupling of the hose to the valve may be very readily effected before the valve is opened for the discharge of water. The plug extension to which the nipple is connected will usually depend downwardly so that when the hose is pulled or drawn away from the valve the lug will be rotated to open the valve. Thus the valve will not be opened until the hose is drawn away therefrom to its place of use and a pull is exerted upon the hose to open the valve.

It will be understood that the structural details of the device may be varied within the spirit and scope of the invention, and that the invention is not limited to such details except as hereinafter made the subject of specific claims and as imposed by the prior art.

I claim as my invention,—

1. The combination with the hollow outlet member of a valve with a plate extending across and fixed to the outer end of said member, and provided with an opening to receive a hose nipple, and an interior gasket within the inner end of said member, of a hose nipple extending through the opening in said plate and bearing at its inner end against said gasket, means to force said nipple against said gasket, and a second gasket confined between said plate and said member and closely fitted upon said nipple.

2. The combination with the outlet member of a valve made flaring toward its outer end and closed at its outer, larger end by a plate having an opening to receive a hose nipple, and an interior gasket within the smaller end of said member, of a hose nipple extending through said opening and bearing at its inner end against said gasket and cam means on said plate and nipple to press said nipple against said gasket.

3. The combination with the outlet member of a valve made flaring toward its outer end closed at its outer, larger end by a plate having an opening to receive a hose nipple, and an interior gasket within the smaller end of said member, of a hose nipple extending through said opening and bearing at its inner end against said gasket, cam means on said plate and nipple to press said nipple against said gasket, and a second gasket at the outer end of said member and closely fitted upon the nipple.

In testimony, that I claim the foregoing as my invention I affix my signature in the presence of two witnesses, this 14th day of April A. D. 1913.

HENRY J. NEUMEISTER.

Witnesses:
W. L. HALL,
G. E. DOWLE.